United States Patent
Evers et al.

(10) Patent No.: US 12,472,127 B2
(45) Date of Patent: Nov. 18, 2025

(54) ORAL SENSORY DEVICE

(71) Applicant: EverSafe Sensory LLC, Hiram, OH (US)

(72) Inventors: Natalie Evers, Burton, OH (US); Johnathan Evers, Burton, OH (US)

(73) Assignee: Eversafe Sensory LLC, Hiram, OH (US)

(*) Notice: Subject to any disclaimer, the term of this patent is extended or adjusted under 35 U.S.C. 154(b) by 286 days.

(21) Appl. No.: 18/098,812

(22) Filed: Jan. 19, 2023

(65) Prior Publication Data

US 2023/0233418 A1 Jul. 27, 2023

Related U.S. Application Data

(60) Provisional application No. 63/302,698, filed on Jan. 25, 2022.

(51) Int. Cl.
*A61J 17/02* (2006.01)
*A61J 17/00* (2006.01)

(52) U.S. Cl.
CPC ............... *A61J 17/02* (2013.01); *A61J 17/10* (2020.05)

(58) Field of Classification Search
CPC ............ A61J 17/00–1012; A61J 17/113
See application file for complete search history.

(56) References Cited

U.S. PATENT DOCUMENTS

| | | |
|---|---|---|
| 3,115,139 A | 12/1963 | Schneider |
| 5,693,073 A | 12/1997 | Glick et al. |
| 5,902,322 A | 5/1999 | Scagliotti |
| 6,468,294 B2 | 10/2002 | Griffith |
| D673,284 S | 12/2012 | Lowsky |
| 8,475,494 B2 | 7/2013 | Marcus et al. |
| D714,441 S | 9/2014 | Lowsky |
| 9,597,256 B1 | 3/2017 | Paul |
| 9,662,184 B2 | 5/2017 | Lowe |
| 10,265,241 B1 | 4/2019 | Paul |
| 10,314,679 B2 | 6/2019 | Blank et al. |
| 11,007,111 B2 | 5/2021 | Paul |
| 11,064,801 B2 | 7/2021 | Pai et al. |
| D932,030 S | 9/2021 | Lowsky |
| D936,233 S | 11/2021 | Lowsky et al. |
| 2005/0119699 A1 | 6/2005 | Sari |
| 2014/0194034 A1* | 7/2014 | Castaneda ............... A63H 3/36 446/385 |
| 2017/0007383 A1* | 1/2017 | Blank ............... A61C 17/3481 |
| 2020/0138673 A1 | 5/2020 | Vargo |
| 2021/0331034 A1 | 10/2021 | Coultes et al. |
| 2021/0361400 A1 | 11/2021 | Keiner |
| 2022/0313560 A1* | 10/2022 | Rawlinson ............ A61J 17/101 |
| 2023/0020849 A1* | 1/2023 | Monahan ............... A61J 11/007 |

FOREIGN PATENT DOCUMENTS

| | | |
|---|---|---|
| GB | 2285751 B | 6/1997 |
| WO | 2020224148 A1 | 11/2020 |
| WO | 2021032950 A1 | 2/2021 |
| WO | 2021233425 A1 | 11/2021 |

* cited by examiner

*Primary Examiner* — Todd J Scherbel
(74) *Attorney, Agent, or Firm* — Hahn Loeser & Parks LLP

(57) ABSTRACT

The present disclosure is for an oral sensory device. The oral sensory device of the present disclosure includes internal components for operating a vibratory motor therein. The internal components are fully encapsulated by a coating. The internal components are inaccessible through the coating. The coating may be a food grade material. More specifically, the coating may be a food grade silicone.

14 Claims, 6 Drawing Sheets

ORAL SENSORY DEVICE

This patent application claims priority to and benefit of U.S. Provisional Patent Application No. 63/302,698, filed Jan. 25, 2022 with the United States Patent and Trademark Office, which is incorporated herein by reference in its entirety.

BACKGROUND

This disclosure relates generally to oral sensory devices and, more specifically, to an occupational therapy oral sensory device relied on to fulfill oral sensory seeking behaviors in adults and children.

Occupational therapy is a branch of health care that helps people of all ages who have physical, sensory, or cognitive problems. Oral sensory devices are often relied on to assist patients with overcoming or managing these conditions. While oral sensory seeking behavior is normal behavior in babies and infants under two years of age (e.g., teething) such behaviors may be a product of developmental conditions (e.g., autism) or a way of managing sensory overload. These behaviors arise in children and adults, alike, in order to self-regulate or self-soothe.

Oral sensory devices that may be inserted into a patient's mouth have been developed to assist with managing, controlling, easing, or overcoming these behaviors. Both children and adults who are presented with significant oral sensory seeking behaviors are faced with the challenge of finding something both safe and effective to fulfill their oral sensory seeking needs. Vibration is one way to increase input. Products currently on the market do not offer the combined durability and safety needed, Products currently marketed towards this population, those with sensory processing disorder, contain removable batteries that are easily accessible to the adult and/or child and require constant supervision for safe use. In addition, products currently marketed towards sensory behaviors that also contain a vibrating component have plastic parts which are easily chewed on and destroyed by the user with a stronger bite than the biting strength of that of babies and infants.

Further, while many oral sensory devices are food safe devices that may be partially inserted into a patient's mouth these oral sensory devices may further include the electrical and mechanical components, as noted above, that are not intended to be inserted into a patient's mouth. To this end, these devices are structured in a manner that distinguish between components that may be inserted into a patient's mouth and components not intended for insertion into a patient's mouth. For example, these devices may have an oral sensory component for insertion into a patient's mouth and a handle, or electrical and mechanical structure, extending therefrom that are not, otherwise, intended for insertion into the patient's mouth. While the distinction between these components provides the user the ability to distinguish between the components relied on for insertion into a patient's mouth and the components which safely house mechanical and electrical components for stimulation (and not safe for insertion into a patient's mouth) there remains a safety risk due to the exposure of these features and a hesitancy to use due to the embarrassment that arises from using such a cumbersome device.

Accordingly, there is a need for a device that does not distinguish between components that may be inserted into a patient's mouth and components that must remain outside of a patient's mouth. In other words, there is a need for a device that is fully insertable into a patient's mouth or that may be entirely utilized for the aforementioned sensory seeking activities. There is a need for such a device to have safety characteristics which prevent a user from inadvertently contacting the electrical and/or mechanical components of the device while maintaining full utility over the entire device for the sensory seeking activities. There is a need for a device which may be fully utilized for sensory seeking activities while fully encapsulating, and making inaccessible, the mechanical and/or electrical components that provide the vibratory stimulation of the device. There is a need for a device that may be safely utilized without the supervision of medical professionals.

SUMMARY

The product of the present disclosure overcomes the above listed problems by offering a durable, food grade or medical grade, vibrating device with a wireless rechargeable battery. A coating (e.g., silicone) fully encases inner components with no ports or access to those components, thereby, allowing for safe and controlled use by all users.

An oral sensory device of the present disclosure comprises a coating fully encapsulating internal components. The internal components include a vibratory motor, an inductive charger, a pressure switch, a wireless rechargeable battery, and connections therebetween. Power is provided to the vibratory motor from the wireless rechargeable battery. Operation of the vibratory motor is controlled by the pressure switch. The wireless rechargeable battery is charged by the inductive charger. The internal components, including the vibratory motor, the inductive charger, the pressure switch, the wireless rechargeable battery, and the connections therebetween are inaccessible through the coating.

In examples, the coating may be a food grade or medical grade coating. In examples, the coating may be silicone. In examples, the coating may be a food grade or medical grade silicone. The coating seals the internal components, including the vibratory motor, the inductive charger, the pressure switch, the wireless rechargeable battery, and the connections therebetween, as provided therein. In examples, no penetrations, seams, or openings are provided in the coating. In some examples, the coating forms a waterproof barrier about the internal components, including the vibratory motor, the inductive charger, the pressure switch, the wireless rechargeable battery, and the connections therebetween.

In one example, the vibratory motor is activated and deactivated by applying pressure to the pressure switch. In another example, the vibratory motor is activated by applying constant pressure to the pressure switch and deactivated by releasing pressure from the pressure switch. The pressure switch may be operated by squeezing and depressing the coating overtop two opposing engaging surfaces of the pressure switch. Examples of pressure switches include a micro momentary pressure switch, a force sensing resistor, or the like. In some examples, the oral sensory device may be remotely activated, remotely deactivated, and/or operated remotely.

In one example, no protrusions or raised edges are present on the exterior of the coating. In another example, one or more ribs may be provided at one or more sides, sections, and/or ends of an oral sensory device. In one specific example, multiple ribs are provided on the sides of the intermediate section extending to the second end. In such an example, the remaining surface remains smooth. In examples, no removable components are present on the oral sensory device and/or on the exterior of the coating. In examples, there are no handles or, in other words, an independent handle does not extend from the oral sensory device. In examples, the exterior of the oral sensory device is entirely the coating. The oral sensory device may take many shapes. In one example, the oral sensory device is symmetrical along at least two axes.

The present disclosure also describes methods of operating an oral sensory device. A method of operating an oral sensory device may comprise the steps of: (i) inserting an oral sensory device, such as that described by those examples herein, into a patient's mouth; (ii) providing power to the vibratory motor from the wireless rechargeable battery; (iii) operating the vibratory motor through the pressure switch; (iv) charging the wireless rechargeable battery through the inductive charger. The methods of operating an oral sensory device may further comprise inserting the entire oral sensory device into the patient's mouth. The oral sensory device may be fully rotated in every direction within the patient's mouth. The method of operating an oral sensory device may further comprise a step of applying pressure to and depressing the coating overtop two opposing engaging surfaces of the pressure switch to engage and disengage the vibratory motor. Alternatively, the method of operating an oral sensory device may further comprise the steps of applying pressure to the coating overtop two opposing engaging surfaces of the pressure switch to engage the vibratory motor and releasing the pressure from the coating overtop the two opposing engaging surfaces of the pressure switch to disengage the vibratory motor. In examples, the vibratory motor may remain engaged when a constant pressure is maintained on the pressure switch.

The foregoing and other objects, features, and advantages of the examples will be apparent from the following more detailed descriptions of particular examples as illustrated in the accompanying drawings wherein like reference numbers represent like parts of the examples.

BRIEF DESCRIPTION OF THE DRAWINGS

Reference is made to the accompanying drawings in which particular examples and further benefits of the examples are illustrated as described in more detail in the description below, in which.

DETAILED DESCRIPTION

Figure 1:
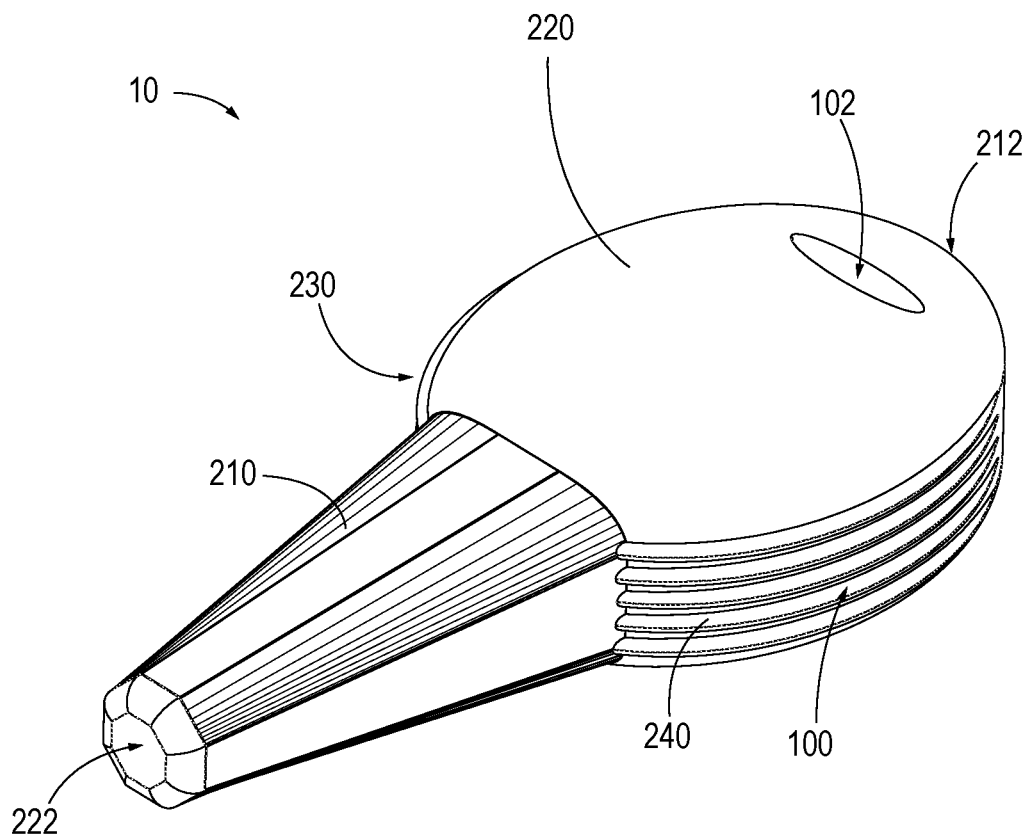
FIG. 1 is a perspective view of an oral sensory device, in accordance with an example of the disclosure.
Figure 2:
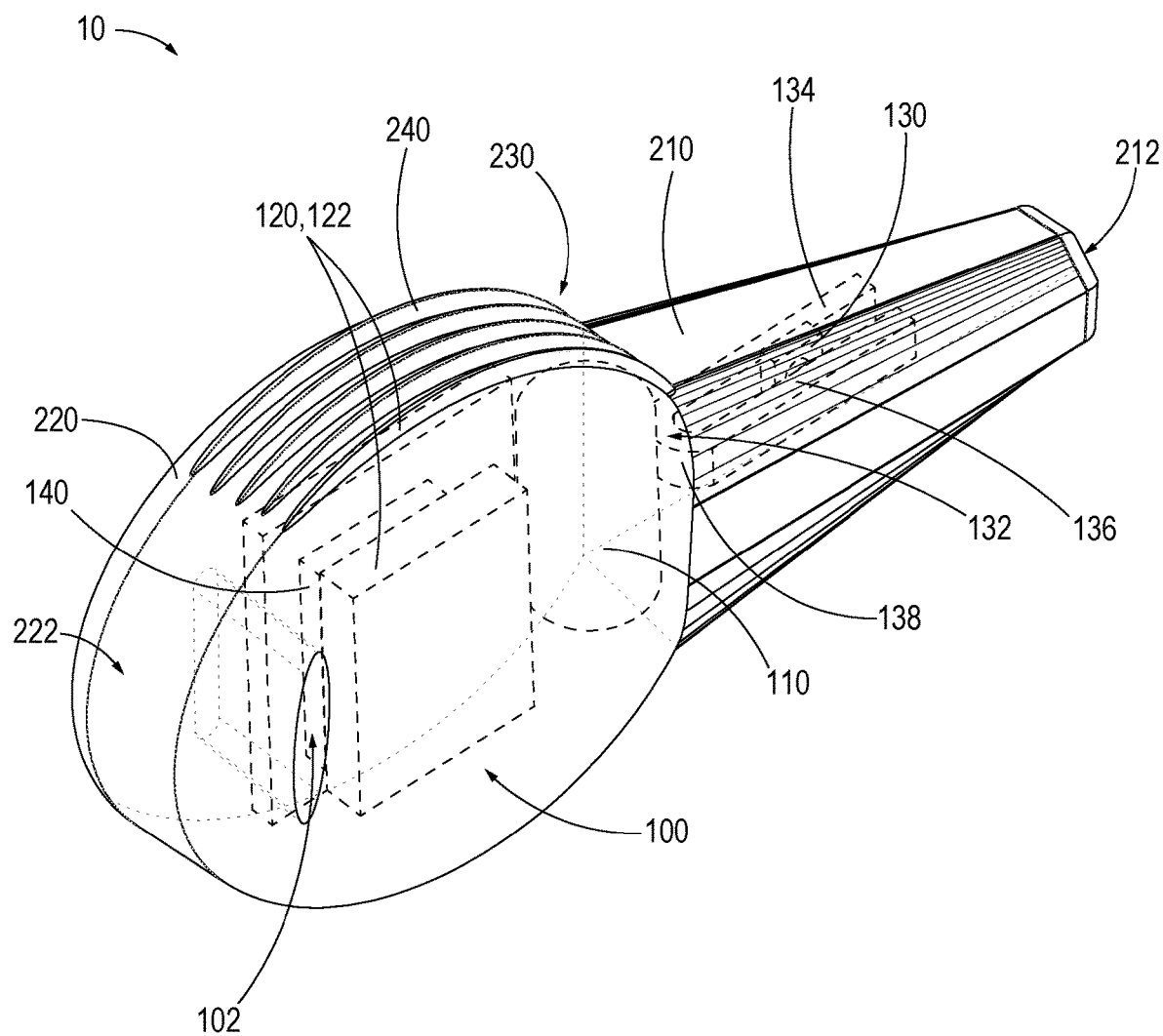
FIG. 2 is a perspective view of an oral sensory device with the internal components identified therein, in accordance with an example of the disclosure.
Figure 7:
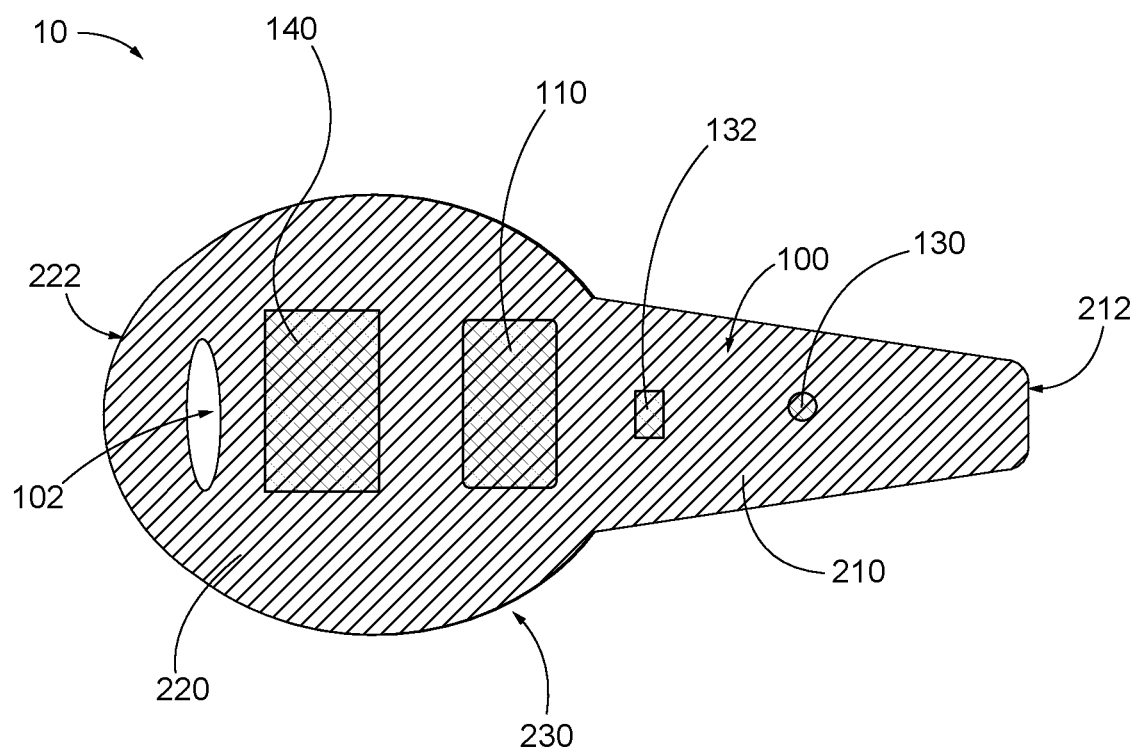
FIG. 7 is a sectional view of an oral sensory device taken at section FIG. 7-FIG. 7 of FIG. 5, in accordance with an example of the disclosure.
Figure 8:
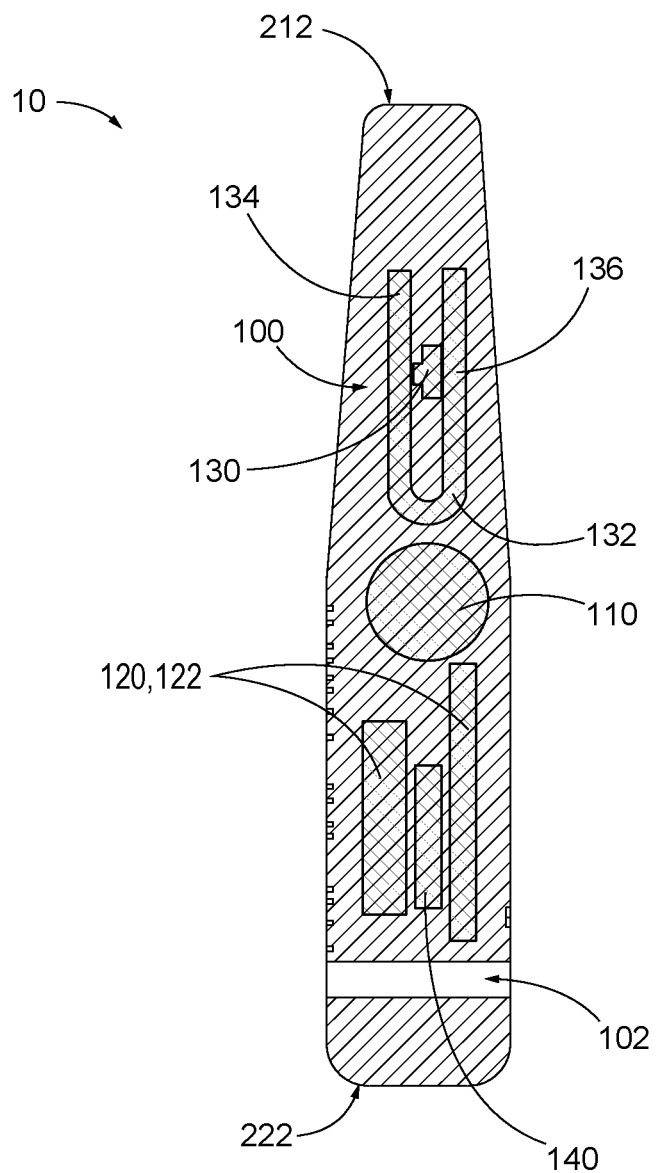
FIG. 8 is a sectional view of an oral sensory device taken at section FIG. 8-FIG. 8 of FIG. 6, in accordance with an example of the disclosure.

The present disclosure relates, generally, to oral sensory devices and, more specifically, to an occupational therapy oral sensory device relied on to fulfill oral sensory seeking behaviors in adults and children. An oral sensory device 10 is illustrated by FIG. 1. The oral sensory device 10 is for insertion into a patient's mouth for manipulation, chewing, and/or biting. The oral sensory device is for managing, relieving, or overcoming oral sensory seeking behaviors. The entire oral sensory device 10 of the present disclosure is capable of being inserted into a patient's mouth. The oral sensory device 10 of FIG. 1 comprises a coating 100, which fully encapsulates internal electrical and mechanical components (as best illustrated by FIGS. 2 and 7-8). The internal electrical and mechanical components are generally referred to herein as internal components. As used herein, fully encapsulated means to be fully surrounded without being accessible from an exterior of the coating 100. By example, no seams, penetrations, or openings are provided into the coating 100 reaching the internal components. In examples, the coating 100 may be a food grade or medical grade material. The coating 100 may be silicone 100. More specifically, the coating 100 may be a food grade or medical grade silicone. The food grade or medical grade silicone may be applied onto or formed about the internal components by way of pouring, forming, molding, brushing, applying, printing, or the like. In examples, the silicone is a medical grade silicone USP Class VI. In examples, the silicone is an FDA approved food grade silicone.

The coating is a compressible material that may be manipulated under pressure. In the present examples, the coating 100 may be manipulated by applying pressure to the exterior of the oral sensory device 10. This pressure may be applied by hand. In specific examples, this pressure may be applied by chewing and/or biting. The pressure translates through the coating 100 onto one or more of the internal components for controlling function of the oral sensory device 10, as further described below. The coating 100 maintains a degree of shape memory and returns, or substantially returns, to its original shape upon release of the pressure. The coating may be of a rubber-like substance or polymeric material. As noted above, the coating may be of a food grade material, but not for consumption. In specific examples, the coating 100 is silicone such as, for example, a food grade silicone.

The coating 100 may be a dense silicone. The density and/or thickness of the coating 100 may vary across the oral sensory device 10. Moreover, the flexibility of the coating 100 may vary based upon the thickness and/or density of the coating at various locations on the oral sensory device 10. Alternatively, the coating 100 may have a constant thickness and/or constant density across the entire oral sensory device 10. In some examples, the coating thickness may be constant while the density varies. Further yet, the coating 100 may have a constant density across the entire oral sensory device 10 while the thickness varies. In each of the examples, the coating 100 remains flexible, or compressible, in nature for operation of the internal components and for fulfilling the oral sensory seeking behaviors by way of chewing and/or biting of the oral sensory device 10. While the internal components may be made of rigid plastic components, or the like, which may otherwise break upon having pressure applied directly to their surfaces, they are protected by way of the resilient coating 100. No internal components are exposed through the exterior of the coating 100. Due to the coating 100, the internal components are resistant to the chewing and/or biting of the oral sensory device 10 and/or the pressure applied by the patient during use of the oral sensory device 10. The degree of protection may vary based on the above noted thickness and/or density of the coating 100 at the respective internal components. The degree of protection the coating provides may be further impacted by the shape of the oral sensory device and/or selected based upon the intended use of the oral sensory device (such as, for example, whether the patient possesses a particular biting strength varying from that of a child to an adult). Please note, however, the internal components of the oral sensory device 10 of the present disclosure are not limited to a rigid plastic construction and may be of other material known in the art.

Still referring to FIG. 1, the shape of the oral sensory device 10, as reflected by the coating 100, may reflect the shape of the internal components, such as, for example, each respective electrical and mechanical component, within the coating 100. For example, the shape of the oral sensory device 10 may be a constant thickness of the coating 100 overtop of the respective electrical and mechanical components within the coating 100. In other examples, the shape of the oral sensory device 10 may be based on a varying thickness of the coating 100 overtop the respective internal components within the coating 100, as deemed necessary to provide adequate protection and functionality at each respective electrical and mechanical component. The internal components may comprise features such as a battery management system, including an inductive charger 120 and a wireless rechargeable battery 140. The internal components may additionally comprise a vibratory motor 110. The internal components may further comprise controls such as, for example, a pressure switch 130 and corresponding features. Each of these internal components are illustrated in FIGS. 2 and 7-8.

In the example of FIG. 1, a first end 210 of the oral sensory device 10 reflects the size and shape of a pressure switch 130 and its supporting components (as illustrated in FIGS. 2 and 7-8) and the coating 100 overtop. A second end 220 of the oral sensory device 10 reflects the size and shape of a battery management system and the coating overtop, including the inductive charger 120 and the wireless rechargeable battery 140 (as illustrated by FIGS. 2 and 7-8). A vibratory motor 110 (as illustrated by FIGS. 2 and 7-8) may be centrally positioned between the first end 210 and the second end 220. As noted above, a constant thickness of the coating 100 may be maintained about the pressure switch 130, and its supporting components (as illustrated by FIGS. 2 and 7-8) for consistent operation of the pressure switch 130. Alternatively, referring specifically to the example of FIG. 1, the shape of the coating 100 of oral sensory device 10, or portion thereof, may contour or taper from the first end 210 to the second end 220. Still referring to FIG. 1, the second end 220 may further extend from an intermediate section 230 of the oral sensory device 10 in an oval shape to an opposing edge 222, opposite the edge 212 of the first end 210. It is contemplated herein the ends may be any shape. The shapes may comprise curves and/or straight sections. By example, the second end may extend from an intermediate section in a rectangular shape. Regardless of section 230 or end 210, 220, the coating 100 of oral sensory device 10 is contiguous therethrough. In other words, the coating 100 is not divided or separated between sections 230 or ends 210, 220 and forms a single unit. In some examples, the coating 100 of the oral sensory device 10 is additionally homogeneous. As noted above, while the oral sensory device 10 of the present examples are generally oval in shape it is contemplated the oral sensory device 10, or portions thereof, may take any shape such as, for example, circular, cube, prism, pyramid, star, polyhedron, rectangular, a combination thereof, or the like. In other words, any shape is contemplated herein. Moreover, the oral sensory device 10 may be symmetrical in one or more directions, or through a central axis. As illustrated by the examples FIGS. 1-6, the oral sensory device 10 may be symmetrical along at least two axes.

In examples, any portion or section of the oral sensory device 10 is intended to be inserted into a patient's mouth from any direction. In other words, the oral sensory device 10 is capable of being inserted into the patient's mouth from the first end 210 and/or from the second end 220, or any side thereof. The oral sensory device 10 of the present disclosure does not include external components, or exposed components, extending from or exposed through the coating 100, which are not otherwise intended for insertion into the patient's mouth. In specific examples, the oral sensory device 10 of the present disclosure does not include external components, or exposed components extending from or exposed through the coating 100. The oral sensory device may be fully rotated, in any direction (or in every direction), within the patient's mouth. In some examples, the oral sensory device 10 may be fully inserted into the patient's mouth, where a patient is capable of fully concealing the oral sensory device within their mouth.

Turning to FIGS. 2 and 7-8, as noted above, the internal components, or electrical and mechanical components, of an oral sensory device 10 may comprise a vibratory motor 110, an inductive charger 120, a pressure switch 130, and a wireless rechargeable battery 140. The pressure switch may be a micro momentary pressure switch. In another example, the pressure switch may be a force sensing resistor. There are no penetrations, seams, or openings through the coating 100 of the oral sensory device 10 reaching the internal components. The coating 100 of the oral sensory device 10 seals the internal components therein without access thereto. The coating 100 of the oral sensory device 10 forms a waterproof barrier about the internal components encapsulated therein. In other words, the internal components are inaccessible from the exterior of the coating 100. By making the internal components inaccessible there is no possibility they may be directly contacted by a patient, or by the saliva of a patient, upon utilization in a patient's mouth. By example, the oral sensory device 10 of the present disclosure does not have removable batteries (or other removable components). Thereby, supervision may be significantly reduced or eliminated for the use of the oral sensory device of the present disclosure. Instead, a wireless rechargeable battery 140 provides power to the oral sensory device of the present disclosure. Specifically, in order to maintain functionality of the fully encapsulated internal components, the oral sensory device 10 is charged wirelessly. A wireless charger is utilized to provide power directly to the inductive charger 120 of the oral sensory device 10. The wireless rechargeable battery 140 is charged by and holds the charge from the inductive charger 120 by way of a power source separate from the oral sensory device 10. That charge, or power source, is then relied on to operate to the vibratory motor 110 of the oral sensory device 10 through the pressure switch 130.

The oral sensory device 10 is capable of vibrating. The vibratory motor 110 is powered by the power supply of the wireless rechargeable battery 140. When charged, the wireless rechargeable battery 140 transfers the charge, or power source, to the vibratory motor 110 which vibrates from within the coating 100, thereby vibrating the entire oral sensory device 10. A pressure switch 130 is provided to control the vibratory motor 110 of the oral sensory device 10. By example, the pressure switch 130 may directly operate the vibratory motor 110. Additionally, or alternatively, the pressure switch 130 may control the charge, or power supply, being provided to the vibratory motor 110. The internal components may be connected to adjoining components, for the sake of operation, by way of wiring which is additionally encapsulated within the coating 100. As illustrated by FIGS. 2 and 7-8, the internal components are further separated from one another by the coating, as the coating has fully encapsulated each of the respective internal components. The coating may maintain each respective internal component in position relative one another within the oral sensory device 10. Alternatively, the internal components may be directly connected to one another within the coating 100, thereby, forming a singular component with the functionality identified herein. Additionally, or alternatively, the internal components may communicate wirelessly to adjoining components for the sake of operation.

The pressure switch 130 of the oral sensory device 10 of FIGS. 2 and 7-8 may be positioned within a U-shaped pressure plate 132. The pressure switch 130, itself, may be the U-shaped pressure plate 132. The U-shaped pressure plate 132 comprises two opposing engaging surfaces 134, 136 connected at an end 138. The U-shaped arrangement allows the pressure plate 132 to compress under pressure and further assists with decompressing, or returning to its original position, upon release. The compression and decompression of the two opposing engaging surfaces 134, 136 may further apply pressure to a pressure switch 130 positioned therebetween for operation of the oral sensory device 10. While FIGS. 2 and 7-8 illustrates a U-shaped pressure plate 132, additional configurations are contemplated herein. For example, two opposing plates, or two opposing engaging surfaces, may be positioned opposite one another within the coating with the pressure switch positioned therebetween. The coating may maintain each respective engaging surface in position relative one another within the oral sensory device and the coating further assists with decompressing, or returning the pressure plates to their original position, upon release of pressure. In some examples, a pressure switch, independent of each respective engaging surface may be provided. By applying pressure to the two opposing engaging surfaces of the arrangement of FIGS. 2 and 7-8 the pressure switch 130 may be engaged or may be operated. The two opposing engaging surfaces 134, 136 extend the engaging area for operating the pressure switch 130. In some examples, the pressure switch 130 of the oral sensory device 10 may be a force sensing resistor. The force sensing resistor may be the pressure switch 130 being compressed by the pressure plate 132. In examples, the oral sensory device 10 is absent the U-shaped arrangement and pressure may be applied directly to the pressure switch 130 such as, for example, directly to a force sensing resistor through the coating.

Upon engagement, the pressure switch 130 may be triggered to transfer, or cease transferring, the power, or a signal for operation, to the vibratory motor 110. In other words, the vibratory motor may be activated and/or deactivated by the pressure switch 130. The vibratory motor 110 may be controlled directly through an electromechanical arrangement. As noted by one example above, the pressure switch 130 may comprise a micro momentary switch that comprises a pressure plate 132 in a U-shaped arrangement to communicate pressure to a vibratory motor 110. As also noted above, the pressure switch 130 may be a force sensing resistor. In some examples, the force sensing resistor may be an alternative to the micro momentary switch within the U-shaped arrangement. In yet another example, the force sensing resistor may be provided without the U-shaped pressure plate 132, thereby sensing pressure directly through the coating of the oral sensory device 10. In such arrangements, the pressure switch 130, that is a force sensing resistor, may communicate to a printed circuit board 122, also within the oral sensory device 10. The printed circuit board may comprise one or more of a microprocessor, the battery management system, and/or the inductive charger. The printed circuit board further communicates between the pressure switch, the inductive charger, and the wireless rechargeable battery. The force sensing resistor pressure switch 130 communicates pressure to the components of the printed circuit board 122 to activate the vibratory motor 110. The force sensing resistor pressure switch 130 may be pressure sensitive. In other words, the force sensing resistor will measure the intensity of pressure being applied and communicate the level of intensity to the printed circuit board 122 which will correspondingly vary the intensity of vibration of the vibratory motor 110. For example, a low amount of pressure or force will result in less voltage to or vibratory intensity of the vibratory motor 110 while a greater amount of pressure or force will result in a higher voltage to or vibratory intensity of the vibratory motor 110.

Examples of operation may include applying pressure by hand, applying pressure by chewing and/or biting with teeth, applying pressure through a patient's cheek, applying pressure by way of a patient's tongue and/or the top of the mouth, or the like. In some example, operation of the vibratory motor 110 may only occur when pressure is being applied to or is maintained on engaging surfaces 134, 136, or on the pressure switch 130. Under the context above, pressure is applied to the engaging surface 134, 136 through the coating 100 and transfers through the coating 100. In other words, pressure is only indirectly applied by the patient to the engaging surfaces 134, 136 and/or the pressure switch 130. Due to the nature of having pressure applied to the oral sensory device 10, protective covers, protective materials, protective surfaces, or the like may be further provided on one or more of the internal components within the coating. Such protective features may provide additional protection to one or more of the internal components, in addition to the coating.

Figure 3:
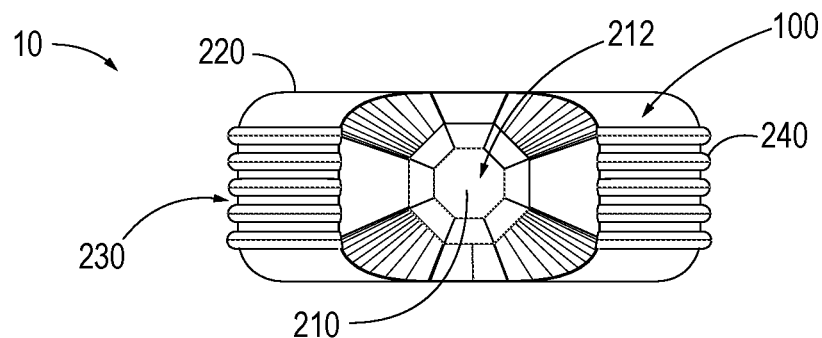
FIG. 3 is a front view of an oral sensory device, in accordance with an example of the disclosure.
Figure 4:
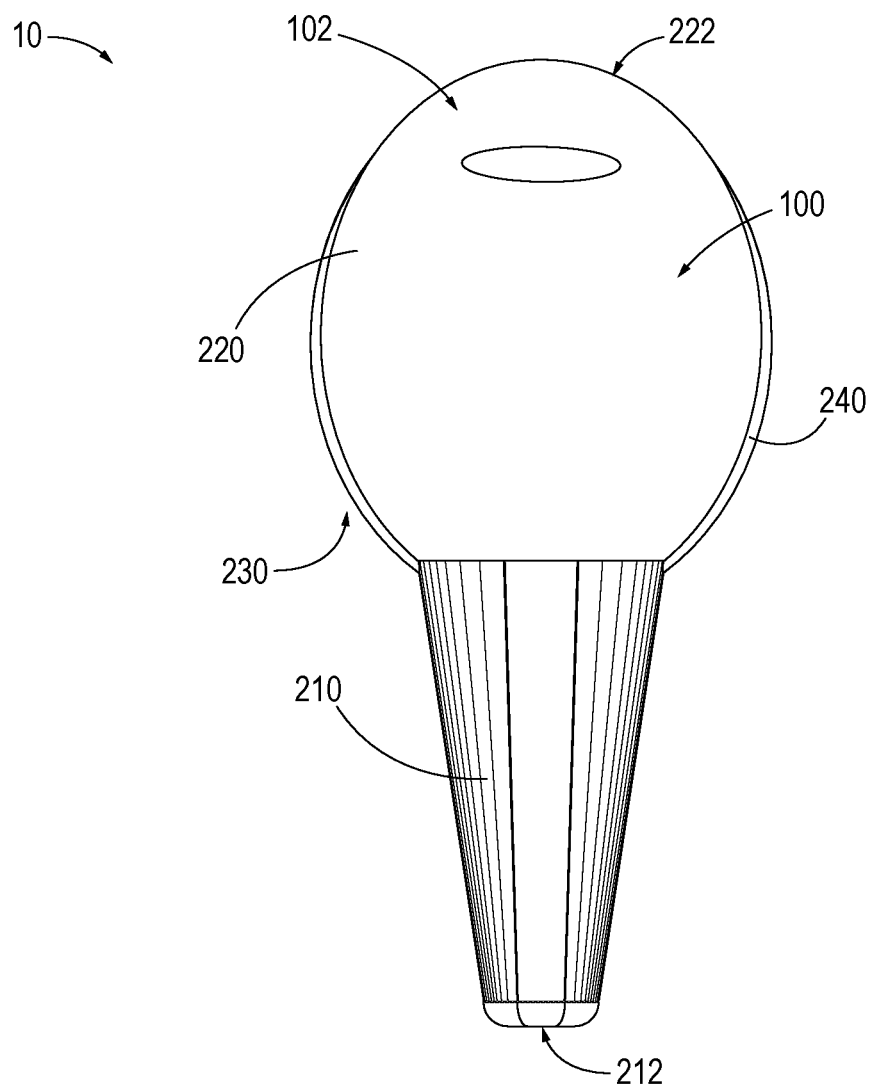
FIG. 4 is a top view of an oral sensory device, in accordance with an example of the disclosure.
Figure 5:
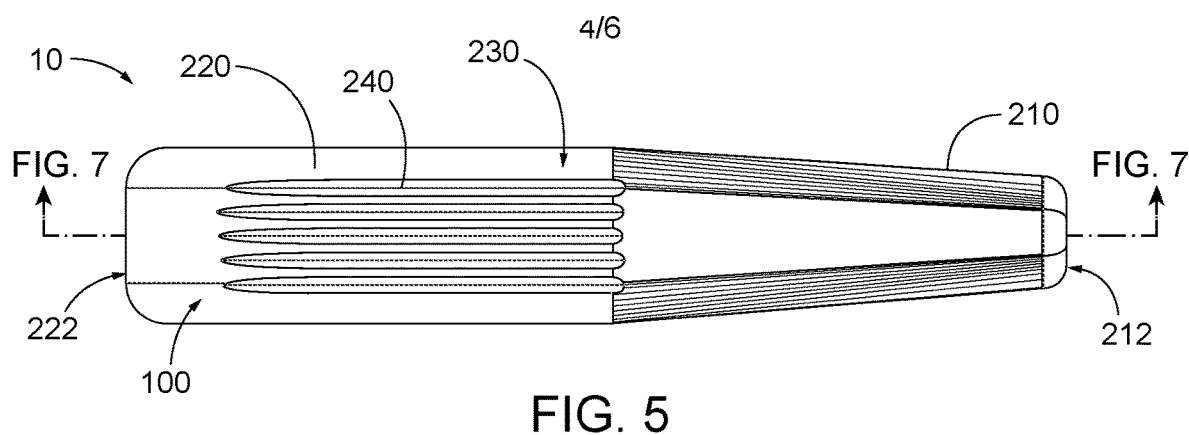
FIG. 5 is a side view of an oral sensory device, in accordance with an example of the disclosure.

FIGS. 3-6 further illustrate the oral sensory device 10 of FIG. 1, with the features of FIG. 1 further illustrated on each of FIGS. 3-6. FIG. 3 is a front view of the oral sensory device 10. The front, or first end 210 of the oral sensory device may be first inserted into the mouth of a patient, as the pressure switch 130 (as illustrated by FIGS. 2 AND 7-8) is positioned within the first end 210 of the oral sensory device 10. A patient may choose to only insert the first end 210 of the oral sensory device 10 into their mouth and maintain control of the oral sensory device by way of their teeth, hands, and/or lips. In this arrangement, the second end 220 of the oral sensory device may extend from the patient's mouth. With the first end 210 of the oral sensory device in a patient's mouth the oral sensory device 10 may be operated, by way of the pressure switch 130 (as illustrated by FIGS. 2 and 7-8), from within their mouth. This, however, does not limit the use of the present oral sensory device 10 to this manner of use. Instead, the oral sensory device may be partially inserted into a patient's mouth from a back side, or the second end 220, of the oral sensory device 10. Again, control of the oral sensory device 10 may be maintained by way of the patient's teeth, hands, and/or lips. Because the pressure switch 130 is positioned within the first end 210 of the oral sensory device 10 the pressure switch may be operated by hand or the patient's lips, as it is not fully inserted within the patient's mouth. FIGS. 4-5 are a top view and bottom view, respectively, of the oral sensory device 10.

Figure 6:
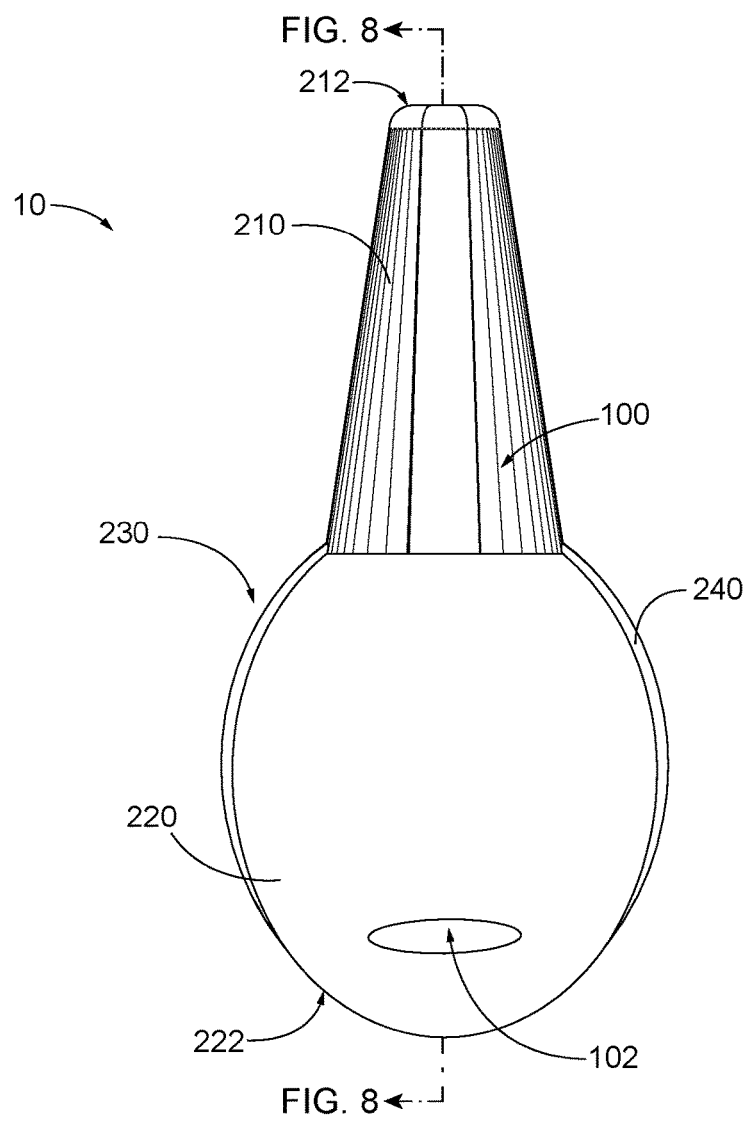
FIG. 6 is a bottom view of an oral sensory device, in accordance with an example of the disclosure.

Just as the first end 210 and/or the second end 220 may be inserted into the patient's mouth, the oral sensory device 10 may be inserted into the patient's mouth from top or the bottom. Finally, FIG. 6 is a side view of the oral sensory device. Again, just as the first end 210 and/or the second end 220 may be inserted into the patient's mouth, the oral sensory device 10 may be inserted from one side or another. As noted above, the entire oral sensory device may be inserted into the patient's mouth and moved around by the patient within the patient's mouth.

In some specific examples, the coating may comprise an aperture 102 therein. Such an aperture 102 may be provided to extend a lanyard therefrom. The lanyard may be provided for storing, hanging, and/or carrying the oral sensory device. The lanyard may additionally, or alternatively, be provided for supporting the oral sensory device 10 about a patient's neck when in use and/or when not in use. The oral sensory device 10 may be connected to other items by way of the aperture such as, for example, to a key chain, a combination of oral sensory devices 10, or the like. In no instance is the internal components exposed by or exposed through the aperture 102. In the present examples, the aperture 102 extends through the second end 220 of the oral sensory device 10. Still yet, a handle, exposing electrical and mechanical components, does not extend from or form a part of the oral sensory device 10 of the present disclosure.

In some specific examples, the external surface of the coating is a smooth surface. While the external surface may possess transitions, due to its shape, it may otherwise be smooth. In other words, no protrusions, raised ridges, or additional features extend from the surface of the coating. Without protrusions, raised ridges, or other features extending from the surface of the coating these features may not inadvertently be removed from, or chewed from, the surface of the coating and, otherwise, inadvertently be swallowed. Accordingly, in such examples, no removable components form a part of or are present on the oral sensory device. In other examples, and as illustrated by FIGS. 1-6, one or more ribs 240 may be provided at one or more sides, sections, and/or ends of an oral sensory device 10. In FIGS. 1-6, multiple ribs 240 are provided on the sides of the intermediate section 230 extending to the second end 220. The first end 210 remains smooth. In other words, portions of the external surface may be smooth while other portions of the external surface may comprise raised ridges or other features such as, for example, ribs. Ribs may provide for adding grip, texture, and/or varying aesthetics to the oral sensory device.

Also disclosed herein are methods of operating an oral sensory device, such as that described above. In a method of operating an oral sensory device the oral sensory device may be inserted into a patient's mouth. Power is provided to the vibratory motor from the wireless rechargeable battery. The method may further comprise operating the vibratory motor through the pressure switch. This may be done by squeezing, pushing, biting, chewing, applying pressure, or the like to the pressure switch through the coating of the oral sensory device. In a specific example, the pressure switch may be activated by applying pressure to the coating overtop two opposing engaging surfaces positioned within the coating. The two opposing engaging surfaces then further apply pressure to a pressure switch, thereby, engaging and disengaging the pressure switch in order to further operate the vibratory motor. As noted above, the pressure switch may be a micro momentary switch or a force sensing resistor. The pressure switch may be provided with the two opposing engaging surfaces of a pressure plate as noted above or, in another example, absent the pressure plate(s) altogether and receive the pressure directly through the oral sensory device. The pressure switch may further communicate through a printed circuit board which may comprise one or more of a microprocessor, the battery management system, and the inducive charger. In some examples, the method may comprise a step of applying constant pressure and/or maintaining pressure on the pressure switch through the coating to engage operation of the vibratory motor. Thereafter, pressure may be released from the pressure switch due to the rebounding nature (shape memory) of the coating in order to disengage the operation of the vibratory motor. The pressure switch may be a micro momentary pressure switch controlling a circuit of the vibratory motor by transitioning the circuit from an opened arrangement to a closed arrangement, and vice versa, upon applying and removing pressure from the micro momentary switch for operating the vibratory motor. The pressure switch may additionally be able to measure varying intensity of pressure and may correspondingly communicate varying voltage or vibratory intensity to the vibratory motor. This may be communicated through a printed circuit board comprising one or more of a microprocessor, the batter management system, and the inductive charger. The method may further comprise charging the wireless rechargeable battery through an inductive charger of the oral sensory device. In some examples the entire oral sensory device may be inserted into the patient's mouth. In some examples the oral sensory device may be rotated within the patient's mouth.

In some examples, the oral sensory device may be remotely activated, remotely deactivated, and/or operated remotely. For example, the oral sensory device may further comprise Bluetooth functionality. With Bluetooth functionality the oral sensory device may be operated remotely. The oral sensory device may be turned on and off remotely. The intensity of the oral sensory device may be operated remotely. The Bluetooth functionality may be operational through an app such as, for example, a phone software application (e.g., app). Operational settings may also be controlled through the Bluetooth functionality such as, for example, whether the device may be operated through the app or directly by the pressure switch, independently or together. The Bluetooth functionality may additionally, or alternatively, remotely control the intensity level (e.g., pulse, low to high alternating vibration, etc.).

While this invention has been described with reference to examples thereof, it shall be understood that such description is by way of illustration only and should not be construed as limiting the scope of the claimed examples. Accordingly, the scope and content of the examples are to be defined only by the terms of the following claims. Furthermore, it is understood that the features of any example discussed herein may be combined with one or more features of any one or more examples otherwise discussed or contemplated herein unless otherwise stated.

What is claimed is:

1. An oral sensory device comprising:
   a coating fully encapsulating a vibratory motor, an inductive charger, a pressure switch, a wireless rechargeable battery, and connections therebetween;
   wherein power is provided to the vibratory motor from the wireless rechargeable battery;
   wherein operation of the vibratory motor is controlled by the pressure switch, the pressure switch requiring a constant pressure be maintained for the operation of the vibratory motor;
   wherein the wireless rechargeable battery is charged by the inductive charger; and wherein the vibratory motor, the inductive charger, the pressure switch, the wireless rechargeable battery, and the connections therebetween are inaccessible through the coating.

2. The oral sensory device of claim 1, wherein the coating is a food grade or medical grade coating.

3. The oral sensory device of claim 2, wherein the coating is silicone.

4. The oral sensory device of claim 1, wherein the coating seals the vibratory motor, the inductive charger, the pressure switch, and the wireless rechargeable battery therein.

5. The oral sensory device of claim 1, wherein no penetrations, seams, or openings are provided in the coating.

6. The oral sensory device of claim 1, wherein the coating forms a waterproof barrier about the vibratory motor, the inductive charger, the pressure switch, and the wireless rechargeable battery.

7. The oral sensory device of claim 1, wherein the pressure switch is operated by squeezing and depressing the coating overtop two opposing engaging surfaces of the pressure switch.

8. The oral sensory device of claim 1, wherein no removable components are present on the oral sensory device.

9. The oral sensory device of claim 1, wherein a handle does not extend from the oral sensory device.

10. The oral sensory device of claim 1, wherein the pressure switch is a force resisting sensor.

11. The oral sensory device of claim 1, wherein an exterior of the oral sensory device is entirely the coating.

12. The oral sensory device of claim 1, wherein the oral sensory device is symmetrical along at least two axes.

13. The oral sensory device of claim 1, wherein the operation of the vibratory motor is deactivated upon release of the constant pressure on the pressure switch.

14. The oral sensory device of claim 1, wherein the operation of the vibratory motor is variably controlled by applying a varying intensity of pressure to the pressure switch.

* * * * *